(12) United States Patent
Kennedy

(10) Patent No.: US 6,934,635 B2
(45) Date of Patent: Aug. 23, 2005

(54) APPARATUS AND METHOD FOR MEASUREMENT OF THE MAGNETIC INDUCTION TENSOR USING TRIAXIAL INDUCTION ARRAYS

(75) Inventor: W. David Kennedy, Weybridge (GB)

(73) Assignee: ExxonMobil Upstream Research Company, Houston, TX (US)

(*) Notice: Subject to any disclaimer, the term of this patent is extended or adjusted under 35 U.S.C. 154(b) by 102 days.

(21) Appl. No.: 10/609,763

(22) Filed: Jun. 30, 2003

(65) Prior Publication Data

US 2004/0059515 A1 Mar. 25, 2004

Related U.S. Application Data

(60) Provisional application No. 60/394,813, filed on Jul. 10, 2002.

(51) Int. Cl.⁷ .............................. G01V 1/40; G01V 3/10
(52) U.S. Cl. .......................................... 702/7; 324/339
(58) Field of Search .............................. 702/7; 324/339, 324/338

(56) References Cited

U.S. PATENT DOCUMENTS

| | | | | | |
|---|---|---|---|---|---|
| 4,349,781 | A | * | 9/1982 | Vozoff ......................... | 324/346 |
| 5,115,198 | A | * | 5/1992 | Gianzero et al. ............ | 324/339 |
| 5,781,436 | A | | 7/1998 | Forgang et al. ............. | 364/422 |
| 5,999,883 | A | | 12/1999 | Gupta et al. ................... | 702/7 |
| 5,999,884 | A | | 12/1999 | Kriegshauser et al. ......... | 702/7 |
| 6,147,496 | A | | 11/2000 | Strack et al. ................ | 324/343 |
| 6,304,086 | B1 | * | 10/2001 | Minerbo et al. ............. | 324/338 |
| 6,393,364 | B1 | * | 5/2002 | Gao et al. ...................... | 702/7 |
| 6,466,872 | B1 | * | 10/2002 | Kriegshauser et al. ......... | 702/7 |
| 6,470,274 | B1 | * | 10/2002 | Mollison et al. ................ | 702/7 |
| 6,502,036 | B2 | * | 12/2002 | Zhang et al. ................... | 702/7 |
| 6,529,833 | B2 | * | 3/2003 | Fanini et al. .................. | 702/7 |
| 6,553,314 | B2 | * | 4/2003 | Kriegshauser et al. ......... | 702/7 |
| 6,556,016 | B2 | * | 4/2003 | Gao et al. .................... | 324/343 |
| 6,618,676 | B2 | | 9/2003 | Kriegshauser et al. ......... | 702/7 |
| 6,643,589 | B2 | | 11/2003 | Zhang et al. .................. | 702/7 |

OTHER PUBLICATIONS

Zhdanov et al., Foundations of Tensor Induction Well–Logging, Nov.–Dec. 2001, Petrophysics. vol. 42, No. 6, pp. 588–610.*

(Continued)

*Primary Examiner*—Michael Nghiem
*Assistant Examiner*—Toan M. Le
(74) *Attorney, Agent, or Firm*—Gary Katz

(57) ABSTRACT

An apparatus and a method for recording the magnetic induction tensor induced in an earth formation are provided. The apparatus includes a magnetic induction device having at least three mutually orthogonal transmitter dipoles and at least three mutually orthogonal receiver dipoles that are direct-coupled, and at least three mutually orthogonal receiver dipoles that are cross-coupled. The method includes using the apparatus to sample the magnetic induction tensor components at a point. Further, samples may be taken at regularly spaced intervals using the magnetic induction device, moving the triaxial logging unit so that each transmitter and each receiver sequentially occupy the same point, repeating these steps until each transmitter and receiver array have sequentially occupied all desired points, and combining the magnetic induction tensor components to form the magnetic induction tensor. These components are useful in inferring water saturation and estimating hydrocarbon volumes in petroleum reservoirs.

25 Claims, 4 Drawing Sheets

OTHER PUBLICATIONS

Nekut, Anisotropy Induction Logging, Mar. 1994, Geophysics, vol. 59, No. 3, pp. 345–350.*

Kennedy, W. D., Herrick, D. C., Yao, T. (2001) "Calculating Water Saturation in Electrically Anisotropic Media", Petrophysics, vol. 42, No. 2, pp. 118–136.

Weiss, C. J. et al. (2001) "Visualization of Eddy Currents Induced in an Electrically Anisotropic Formation", Petrophysics, vol. 42, No. 6., pp. 580–587.

Zhdanov, M. et al. (2001) "Principles of Tensor Induction Well Logging in a Deviated Well in an Anisotropic Medium", SPWLA 42nd Ann. Logging Symp., Jun. 17–20, 2001, Houston Texas, 14 pages.

Zhdanov, M., Kennedy, W.D., Peksen, E., "Foundations of Tensor Induction Well–Logging", Petrophysics, vol. 42, No. 6., pp. 588–610. Nov. 12, 2001.

* cited by examiner

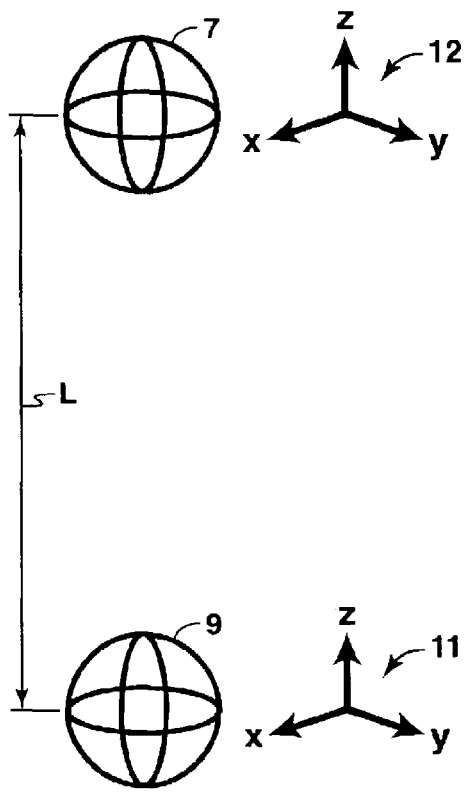
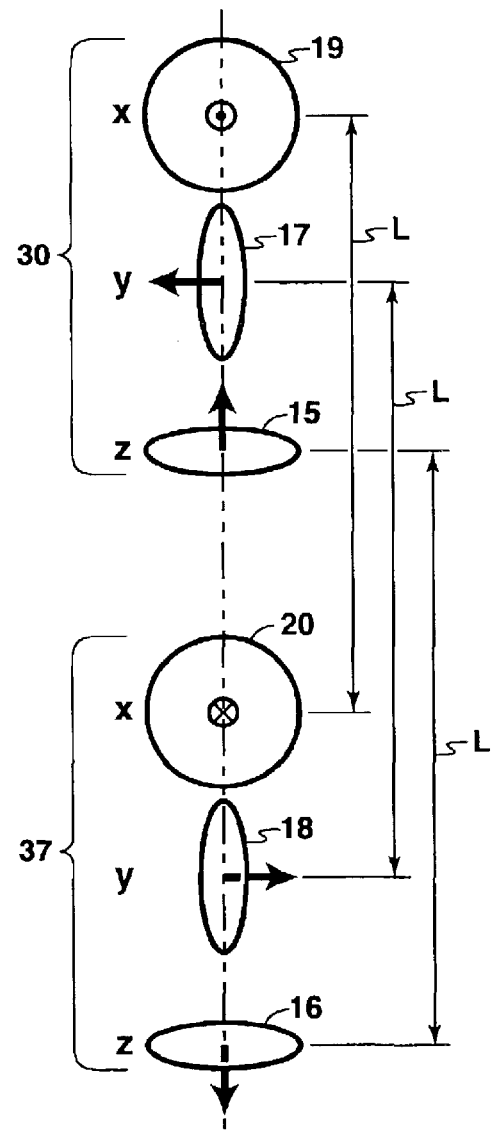
FIG. 2A
PRIOR ART
FIG. 2B
PRIOR ART

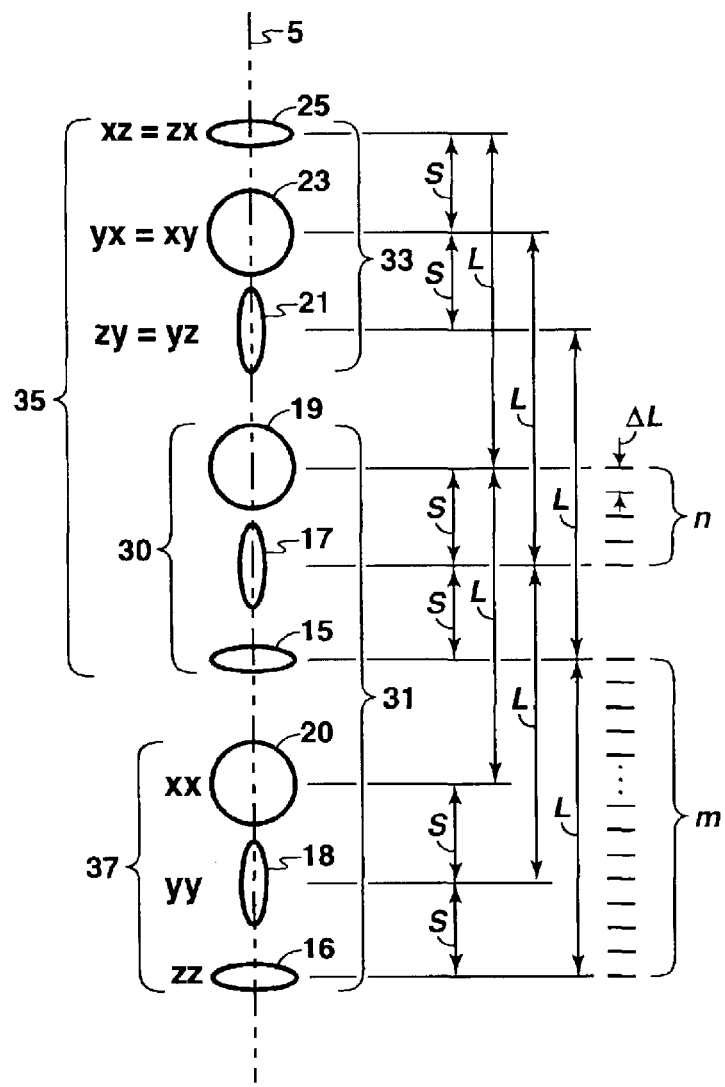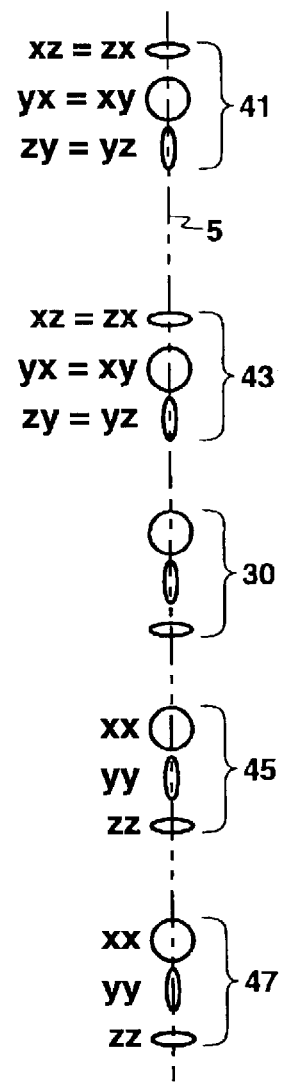
FIG. 3          FIG. 4

APPARATUS AND METHOD FOR MEASUREMENT OF THE MAGNETIC INDUCTION TENSOR USING TRIAXIAL INDUCTION ARRAYS

This application claims the benefit of U.S. Provisional Application No. 60/394,813 filed on Jul. 10, 2002.

FIELD OF THE INVENTION

This invention is related generally to the field of electromagnetic induction logging instruments. More specifically, the invention is related to an apparatus and a method for electromagnetic resistivity logging in electrically anisotropic media using mutually orthogonal magnetic dipole transmitters and mutually orthogonal magnetic dipole receivers.

BACKGROUND OF THE INVENTION

The amount of oil and/or gas in a subterranean reservoir will determine whether developing the reservoir and bringing the oil or gas to the surface is economical. Sedimentary reservoir rocks comprise a porous medium. The pore spaces in these rocks are typically fluid-filled, usually with a brine that is electrically conductive and relatively dense. Hydrocarbon fluids are electrically resistive and less dense than brine. During hydrocarbon emplacement in the pore spaces of a reservoir rock, hydrocarbons will typically accumulate by buoyantly displacing brine from the pore spaces. Rocks filled with oil and/or gas are more resistive than brine-filled rocks. The resistivity contrast between brine-filled and hydrocarbon-filled rocks provides a means of remotely sensing the presence of hydrocarbons using instruments lowered into a well from the surface.

A remote sensing technique used to quantify the amount of oil or gas in a reservoir is called resistivity logging. Resistivity logging instruments respond primarily to the reciprocal of resistivity, or conductivity, and these instruments are referred to in the remainder of this document as "conductivity logging instruments." Formation conductivity, inferred from conductivity logging instrument responses, is used in conjunction with laboratory conductivity measurements to estimate whether commercial quantities of hydrocarbons exist in potential hydrocarbon reservoirs. Further, formation conductivity is commonly used (with other measurements) to quantitatively evaluate the amount of hydrocarbons in the reservoir. Persons skilled in the art can produce hydrocarbons after a hydrocarbon reservoir has been located using formation conductivity or other means.

The electrical conductivity property at any given point in a reservoir will in general vary according to the direction in which the property is measured. In a specified small volume of the reservoir, the conductivity measured in a nominal horizontal (i.e., parallel to sedimentary bedding plane) direction typically will differ from the conductivity measured in a nominal vertical (i.e., perpendicular to sedimentary bedding plane) direction. In many reservoir rocks, there will also exist two different values of conductivity oriented in mutually orthogonal directions in the nominal horizontal plane.

In general, at every point in the conductive medium there are three mutually orthogonal conductivity values that can be taken as defining a Cartesian coordinate system with its orthogonal axes being characterized by the conductivity values. The axes of the Cartesian coordinate system defined by the three mutually orthogonal conductivity values are called the principal components, or principal axes, of the conductivity tensor. The principal axes of the conductivity tensor are further characterized by their orientation with respect to the earth. This orientation can be described by three angles that measure the orientation of the conductivity tensor with respect to axes directed north-south, east-west, and up-down. Thus, at each point in the medium, six numbers are required to specify the conductivity values and their orientation (i.e., three angles and three magnitudes of the conductivity tensor). The conductivity tensor is specified by these six numbers. When the three mutually orthogonal conductivities are the same, there is no preferred direction in the medium and the three angles can be considered zero. For such cases, the conductivity tensor reduces to a single number representing conductivity. When the medium conductivity is represented by a single number, the medium is isotropic. Otherwise, the medium is anisotropic. Most sedimentary formations are anisotropic.

This anisotropic complexity has not been recognized in conventional formation evaluation. The differences in the horizontal conductivity components in vertical wells that penetrate horizontally bedded sedimentary rocks have been assumed to be negligible. Further, the vertical component of conductivity has been assumed to be either the same as the horizontal component of conductivity or else assumed not to excite a response in conductivity logging instruments operated in vertically drilled wells. Laboratory conductivity measurements have always been oriented to sample a nominally horizontal, but otherwise unspecified, component of a rock's conductivity. Therefore, formation resistivity at a point in a hydrocarbon-bearing reservoir rock has typically, but inaccurately, been characterized by a single number (known by the misnomer $R_t$, for "true" resistivity) rather than the six independent numbers comprising the elements of a conductivity tensor.

The introduction of horizontal drilling techniques and their widespread use has resulted in instruments and techniques developed for vertical wells being applied in deviated, highly deviated, and horizontal wells. These techniques are often unsuccessful because of the inappropriateness of these instruments and techniques for use in any environment except vertical wells or isotropic media.

The poor response characteristics of conventional conductivity logging instruments to anisotropic formations is typified by "low resistivity pay." In vertical wells drilled through hydrocarbon bearing sand-shale reservoirs, an induction instrument response can be dominated by highly conductive shales. Despite commercial quantities of high resistivity hydrocarbon-bearing sandstones surrounding the instru-, ment in the reservoir, the apparent resistivity does not unambiguously reflect the presence of these hydrocarbons. Thus, this kind of reservoir has been called "low resistivity pay" in the oil and logging industries. Conversely, compared to the vertical wells, the apparent resistivity responses of horizontal wells are too high in the presence of anisotropy. The physical mechanism for these anomalously low values of apparent conductivity in horizontal wells is more complicated than for low resistivity pay in vertical wells and has only recently been understood. (Weiss, Chester J., Lu, Xinyou, and Alumbaugh, David, 2001, Visualization of eddy currents induced in an electrically anisotropic formation, Petrophysics, Vol. 42, No. 6.).

In isotropic formations, the response of conventional conductivity logging instruments can be used to accurately estimate formation conductivity. Anisotropic formations have a vertical conductivity component that is different from the horizontal conductivity component (or components). Conventional instruments respond only to the horizontal conductivity if they are deployed in a vertical wellbore. However, in the general case of a fully anisotropic medium and a deviated well, conventional instruments cannot be used to uniquely infer or accurately estimate any of the six components of the conductivity tensor.

An induction logging instrument's transmitters induce magnetic fields in its receivers. The magnetic field at each receiver due to each transmitter is the sum of two components. For specificity, consider only the magnetic field induced in a single receiver excited by a single transmitter. One magnetic field component is called the primary field and represents the voltage induced in the receiver by the magnetic field produced by the transmitter itself. This component exists even when the instrument is immersed in a zero-conductivity medium such as a vacuum or air. The primary field does not contain any information from the environment surrounding the instrument, and is not considered part of the "signal." In a conductive medium the primary field is still induced in the space surrounding the receiver, but there is in addition to the primary field another magnetic field component. The second component of the field arises due to eddy currents induced to circulate in the conductive formation. This "secondary" component of the magnetic field at the receiver is a monotonically increasing function of the conductivity in the environment surrounding the instrument and is considered to be the "signal" to be detected in hydrocarbon logging operations.

The primary component of the field is much larger than the secondary field making detection of the secondary field in the presence of the primary field problematic. Thus, the primary field is always canceled in practical instruments by some means. The primary field is usually cancelled by the use of appropriately located "bucking" coils designed to introduce a signal at the receiver that is oppositely directed but equal in magnitude to the primary field. When the primary field is properly "bucked out" only the signal from the secondary field remains in the receiver.

The primary field in the context of induction logging is sometimes referred to as the "direct" or "direct-coupled" field or signal. However, in the description of triaxial induction instruments the term "direct-coupled" is given a different meaning, as shall be defined in the next paragraph. In the remainder of this description the primary fields are considered to have been compensated by appropriate "bucking coils," or other means. Only signal, or secondary field, components are discussed. Accordingly, as used herein, "signal" will always refer to the secondary field that arises in response to transmitter-induced eddy currents circulating in the conductive formation, and further, the term "direct-coupled" will never refer to the primary field, and will always be used in the sense to be defined below.

New induction logging instrument technologies (e.g., U.S. Pat. Nos. 5,999,883 and 5,999,884) are capable of recording magnetic field data that, under favorable conditions, permit the inference of all three principal components of the conductivity tensor. The new technology as disclosed in these patents differs from the prior art by using transmitters and receivers oriented transverse to the instrument axis in addition to the usual coaxial transmitters and receivers, resulting in a total of three mutually orthogonal transmitters, and a corresponding set of three mutually orthogonal receivers.

Each transmitter is paired to a similarly oriented receiver located at the same distance from the transmitter. The signal (i.e., the secondary field resulting from transmitter-induced eddy currents in the surrounding formation) induced in the receiver by its associated transmitter is referred to herein as a "direct-coupled signal." If a signal is induced in the receiver by either of the other two transmitters it is referred to herein as a "cross-coupled signal." The new technology can record the magnetic field data that permits the inference of the full conductivity tensor only if the instrument axes are parallel to the principal axes of the conductivity tensor. In such cases, all of the magnetic induction tensor components not on the main diagonal of the matrix representing the tensor, and corresponding to cross-coupled transmitter-receiver dipoles, are equal to zero, and hence are known a priori. Therefore, the preferred use of this new technology has been in vertical wells drilled in formations having approximately equal horizontal conductivity principal components. Consequently, the cross-coupling is approximately equal to zero.

As shown in FIG. 1, conventional induction logging instrumentation employs magnetic dipole sources (transmitters) 1, which are oriented coaxially with the instrument axis 5. The detectors or receivers 3 are also oriented coaxially with the logging instrument axis 5. The conventional induction logging array takes many forms but all comprise one or more coaxially arrayed transmitters 1 and one or more coaxially arrayed receivers 3. The mutual axis of the transmitters and receivers dipoles is coaxial with the axis 5 of the instrument on which they are conveyed. Further, the mutual axis of the dipoles is approximately coaxial with the borehole where the instrument is deployed.

The instruments operate by inducing eddy currents in earth formations by means of time-varying magnetic fields generated by their transmitters. As shown in FIG. 1, the induced eddy currents 2 flow in ground loops that tend to circulate in planes that in isotropic formations are substantially perpendicular to the axis of the instrument 5. This current distribution is also characteristic of horizontally-lying anisotropic formations penetrated by vertical well bores. In each case voltages related to the magnitude of the eddy currents are then induced in an instrument's receiver coils. The voltages are then sampled and recorded using equipment known in the art.

The conventional interpretation model for this instrumentation is a homogeneous isotropic medium. The secondary magnetic fields arising from eddy currents induced in a formation are detected by the receiver coil or coils and are related to the formation conductivity. In homogenous isotropic media, this relation is well known and these instruments can make an accurate determination of formation conductivities. However, conventional instruments are often used in an attempt to quantify the conductivity of formations that are inhomogeneous and anisotropic.

Conventional induction instrumentation cannot quantify the conductivity distribution in such media because the axial dipole transmitters and receivers are not capable of sampling the full magnetic induction data space. When the responses of conventional induction instruments to a heterogeneous, anisotropic medium are interpreted without recognition of the nature of the medium, the conductivity is misquantified. Therefore, fluid volume interpretations based upon this conductivity estimate are often misestimated.

As described above, the newest type of induction instruments, triaxial induction instruments, introduce the use of source and receiver magnetic dipoles mounted transverse to the instrument axis in addition to the conventional coaxially-mounted dipoles. FIG. 2A is a diagrammatic illustration of the transmitter 7 and receiver arrays 9 for a triaxial induction logging instrument. The circles are intended to indicate three mutually orthogonal loops of wire (solenoids) sharing the same center point (collocated magnetic dipoles). If electric current flowed in the wires, magnetic fields would arise in the space surrounding the wires. The magnetic dipole moments of these current loops (indicated by arrows 11, 12) provide a convenient alternative graphical representation of the sources (transmitters) 7 and receivers 9.

An "equivalent point magnetic dipole" is an imaginary point magnetic dipole that would produce substantially the same magnetic field at a receiver's location as the actual transmitter coil. The term "center" as used in the text refers to the point inside a coil where an equivalent magnetic dipole could be located.

In FIG. 2A the transmitter array center and receiver array center are spaced apart a distance L. FIG. 2B illustrates a similar transmitter and receiver array except that the transmitter coils 30 have been separated and each transmitter coil is spaced a distance L from the corresponding similarly separated receiver coils 37. In FIG. 2A, both the collocated direct- and cross-coupled coils have the same spacing L. However, in FIG. 2B, illustrating the separated coils, the direct-coupled coils remain spaced at a determined distance of L, but the cross-coupled components are not spaced at the determined distance L.

In the newest induction logging instrument designs, the sources and receivers are arranged in three mutually orthogonal directions. One direction is in the usual coaxial-to-the-instrument-axis orientation and two mutually orthogonal directions are in the transverse-to-the-instrument-axis plane. In principle there are nine possible signal components. Conventional axial-dipole induction instrumentation samples only the axial component of the magnetic field induced by the axially-directed transmitter. This is designated the ZZ direct-coupled response, indicating the response of the z-directed receiver 16 to the z-directed transmitter 15 (See FIG. 2B).

In principle, the new generation of instrumentation should be able to detect the x component 20 and y component 18 of magnetic field at the receiver array due to the excitation of the z source component 15. These are designated the ZX and ZY cross-coupled responses. In isotropic media, the z-component of the source cannot excite a signal in x- and y-directed receiver coils on the axis of the instrument and these cross-coupled signal components will be zero. In anisotropic formations, this is generally not true. Likewise, the horizontal transmitters 17, 19 are coupled to each of the receivers 16, 18, 20. These responses are designated XX, XY, XZ, YX, YY, and YZ. Thus, a total of nine signals characterize the full magnetic induction response data space. However, the principle of electromagnetic reciprocity applies to the transmitter and receiver arrays of this instrument. Therefore the response pairs XY and YX, XZ and ZX, YZ and ZY are the same, thus, for example, making the separate detection of XY and YX unnecessary since detection of one provides the value of the other. This is also true for the remaining two cross-coupled pairs of signals, XZ and ZX, YZ and ZY.

In view of electromagnetic reciprocity, the full magnetic induction data space comprises six independent magnetic field response pairs or six magnetic field components. When three mutually orthogonal transmitter coils are collocated and the three receivers are similarly arrayed collocally, then the six simultaneously (or almost simultaneously) excited and recorded magnetic field components comprise a magnetic induction tensor.

The magnetic induction tensor is a complete description of the magnetic field response at the receiver location due to excitation of a triaxial transmitter at the transmitter location. Ideally, the magnetic induction tensor contains information regarding the conductivity of the medium between the transmitter and receiver. Accordingly, the tensor is conventionally associated with the point in the wellbore (and therefore the earth) midway between the transmitter and receiver. The magnetic induction tensor may be used to deduce, (e.g., using mathematical inversion or other means) the principal components of the conductivity tensor, and the orientations of these principal components. The components of the conductivity tensor can subsequently be used to estimate the hydrocarbon content of the reservoir. Methods to transform the magnetic induction tensor components into the components of the apparent conductivity tensor are known in the art. (Zhdanov, M., Kennedy, W. D., Cheryauka, A. B., Peksen, E., 2001, Principles of tensor induction well logging in a deviated well in an anisotropic medium, 2001 Transactions of Society of Professional Well Log Analysts, Houston Tex.; Zhdanov, M., Kennedy, W. D., Peksen, E., Foundations of tensor induction well-logging, Petrophysics, vol. 42, no. 6., pp 588–610.). Methods for estimating formation water saturation from components of the apparent conductivity tensor are also known (Kennedy, W. D., Herrick, D. C., Yao, T., 2001, Calculating water saturation in electrically anisotropic media, Petrophysics, vol. 42, no. 2, pp. 118–136).

The conventional implementation of this technology as disclosed by Gupta, et al. in U.S. Pat. Nos. 5,999,883 and 5,999,884 does not employ collocated transmitters and receivers. A possible reason for the lack of collocated transmitters and receivers in the Gupta instrument include difficulties in the manufacturability of such transmitter and receiver arrays. Whatever the reason, for the instrument described in the Gupta patents and illustrated in FIG. 2B the transmitter array is separated into three separate coils spaced along the instrument axis. The receiver array is also separated into three independent, non-collocated coils such that the spacings between corresponding transmitter and receiver of each pair of coils are equal. This arrangement of transmitters and receivers allows the detection of the three direct-coupled magnetic field components referred to above as XX, YY, and ZZ.

The three direct-coupled magnetic field components comprise three of the six independent components of a magnetic induction tensor characteristic of the formation at a point, and have a representation as the diagonal elements of a 3×3 matrix. The off-diagonal elements of the matrix represent the cross-coupled elements of a magnetic induction tensor. The cross-coupled components generated by the Gupta instrument coil arrangement are not spaced at the correct distances to be components of the same tensor as the direct-coupled signals.

There are no provisions in the Gupta instrument patents to correctly obtain these missing cross-coupled components of the magnetic induction tensor. The cross-coupled components are approximated based upon the responses of the coils that are contained in the Gupta instrument array, but these coils are improperly spaced to detect the missing components of the magnetic induction tensor. Cross-coupled coils provided for the purpose of detecting cross-coupled signals are also improperly spaced to detect the missing components of the magnetic induction tensor. Therefore, the Gupta instrument does not respond directly to the full data space necessary to detect and resolve the conductivity tensor.

When the axis of the Gupta magnetic induction instrument is parallel to one of the principal axes of the conductivity tensor, then it is known a priori that the cross-coupled terms are zero. For all such cases, the instrument fully resolves the three direct-coupled magnetic induction tensor components. In such cases, the cross-coupled magnetic induction tensor components are assumed to be known (i.e., assumed to be zero) a priori and the full magnetic induction tensor data space is assumed to have been sampled and the conductivity tensor can then be deduced. Otherwise, the conductivity tensor cannot be deduced. The Gupta instrument was apparently designed to quantify "low resistivity pay" in vertical wells where the geometrical restrictions mentioned above usually prevail, but the design is not optimized for use in deviated and horizontal wells.

The problem with the current technology is its inability to acquire all six components of the magnetic induction tensor regardless of the relative orientation of the logging instrument and the principal axes of the conductivity tensor. Accordingly, to adequately evaluate electrically anisotropic formations, new instrumentation is necessary to determine the magnitudes and the directions of each of the six components of the magnetic induction tensor at each point in a formation. The present invention satisfies this need.

SUMMARY OF THE INVENTION

The present invention provides an apparatus capable of recording the full magnetic induction tensor. The apparatus comprises at least one triaxial transmitter array having at least three transmitter dipoles, three of the dipoles being mutually orthogonal, and at least two receiver arrays each having at least three receiver dipoles, three of the dipoles in each receiver array being mutually orthogonal. Each transmitter dipole corresponds to at least one receiver in each receiver array. At least one receiver dipole corresponding to each transmitter dipole is a direct-coupled receiver, and at least one receiver dipole corresponding to each transmitter dipole is a cross-coupled receiver. Further, the instrument has means for detecting voltages induced in the receivers and storing them for later use.

Another embodiment of the apparatus consists of at least one triaxial receiver array having at least three receiver dipoles, three of the dipoles being mutually orthogonal, and at least two transmitter arrays each having at least three transmitter dipoles, three of the dipoles in each transmitter array being mutually orthogonal. Each receiver dipole corresponds to at least one transmitter dipole in each transmitter array. At least one transmitter dipole corresponding to each receiver dipole is a direct-coupled transmitter, and at least one transmitter dipole corresponding to each receiver dipole is a cross-coupled transmitter. Further, the instrument has means for detecting voltages induced in the receivers and storing them for later use.

The invention further provides a method to record the full magnetic induction tensor. The magnetic induction tensor is obtained by sampling and storing receiver signals at regularly spaced points in the logged interval using the magnetic induction logging instrument. Having obtained the first observations at the first point in the logged interval, the magnetic induction logging instrument is moved to the next regularly spaced sample point where additional signals are sampled and stored for later use. The process is repeated until each transmitter and each receiver has sequentially occupied the same set of sample points. Once this event has occurred synthesis of the magnetic induction tensor corresponding to each subsequent sampled point in the formation is performed.

BRIEF DESCRIPTION OF THE DRAWINGS

The present invention and its advantages will be better understood by referring to the following detailed description and the attached drawings in which:

FIG. 2A is a schematic illustration of mutually orthogonal collocated loops of transmitter and receiver arrays for a triaxial induction logging instrument;

FIG. 2B is a schematic illustration of separated mutually orthogonal loops of transmitter and receiver arrays in a triaxial induction logging instrument;

FIG. 3 is a schematic illustration of a triaxial induction logging instrument with a transmitter array located between two receiver arrays;

FIG. 4 is a schematic illustration of an embodiment of the triaxial induction logging instrument with four receiver arrays deployed around the same transmitter;

DETAILED DESCRIPTION

Figure 1:
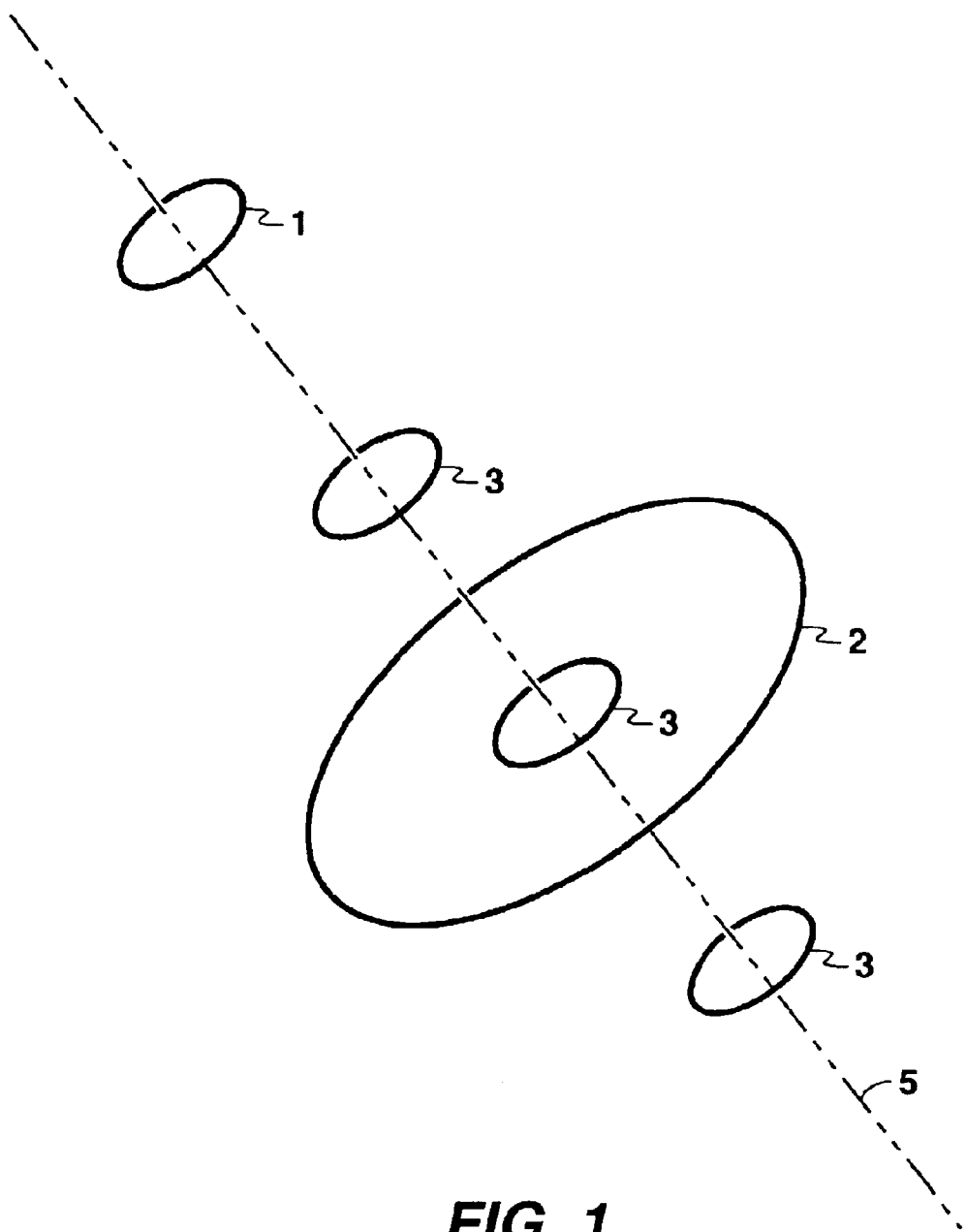
FIG. 1 is an illustration of a conventional coaxial-coil induction logging instrument.

A schematic representation of one embodiment of the invention is illustrated in FIG. 3. Three sets of three-coil arrays (30, 33, 37) are located along the instrument axis 5. The lower two sets 31 of three-coil arrays comprise the direct-coupled transmitter-receiver coils and are the same as the array shown in FIG. 2B. The corresponding direct-coupled transmitter-receiver coils in the direct-coupled array 31 are each separated a distance L. The receiver array of the direct-coupled transmitter-receiver array responds to the XX 20, YY 18, and ZZ 16 direct-coupled signals. The upper three-coil array 33 is an additional receiver array intended for use with the same transmitter array 30 used by the direct-coupled transmitter-receiver array. The upper three-coil array comprises the cross-coupled receiver coils. The cross-coupled receiver coils are spaced the same distance L from their corresponding transmitter coils as the coils of the direct-coupled transmitter-receiver array 31. The cross-coupled transmitter-receiver array 35 responds to the XZ 25, YX 23, and ZY 21 cross-coupled signals. The coils comprising each three-coil array, whether a transmitter array or a receiver array, are distributed along the instrument axis with a spacing S between each pair of adjacent coils within each array.

A magnetic field comprises continuous closed loops of magnetic field called "flux". The flux loops are induced by a loop of electric current and can induce a voltage in a second electric circuit if, and only if, some of the flux lines from the source loop pass through the second loop (magnetic field detector). When a loop of flux that passes through the region bounded by the transmitter loop also passes through the region bounded by the receiver loop, the flux line is said to "link" the transmitter and receiver, much like a key-ring "links" keys by passing through holes in the keys. If one of the keys is not on the key ring it is not "linked". Flux that does not "link" the receiver cannot induce a voltage in it.

As has previously been mentioned, the voltage in the receiver coils due to the flux from the primary fields is cancelled by the use of bucking coils or other means. The important flux linkage is between the receivers and the source of the signal, which are eddy currents induced to circulate in the formation by the instrument transmitters. In homogeneous, isotropic formations each eddy current is coaxial with one of the transmitter dipoles. In general, for inhomogeneous, anisotropic formations this will be true only to some approximate degree. However, in visualizing and discussing flux linkages, by convention it has proved convenient to label the "direct-" and "cross-coupled" signals in terms of the transmitters that produce the eddy currents and the receivers that detect them.

For a direct-coupled configuration of a transmitter and receiver, the transmitter and receiver dipole moments are parallel (or alternatively, the transmitter and receiver coils lie in the same plane) and the magnetic flux linkage in an isotropic medium is the maximum amount, and a maximum voltage is developed in the receiver.

For the cross-coupled configuration of transmitter and receiver the receiver dipole moments are orthogonal (perpendicular) to the transmitter dipole moments (the planes of the source and receiver loops are mutually orthogonal). In isotropic media, the cross-coupled receiver coils have no flux linkage with the corresponding transmitter and no voltage is developed in these receivers as a result. In anisotropic media, the media can distort the flux and induce a "flux linkage" (and therefore a voltage and therefore a signal) in the cross-coupled coils.

The instrument signal is recorded by periodically sampling the receiver responses and storing the sampled data for later use in synthesizing the magnetic induction tensor. The sample frequency (i.e., number of samples per unit length) desired influences the design of the coil configuration. The sampling interval $\Delta L$ and the number of sample intervals between coils n is the basis for both the spacing between the transmitter centers in the transmitter array S and the spacing between the receiver centers in the receiver arrays S. The sampling interval $\Delta L$ is also the basis for the spacing between a transmitter in the transmitter array and the corresponding receivers in the receiver arrays L. FIG. 3 illustrates a typical example. This example shows that for a sampling rate of four samples per foot, or a sampling interval $\Delta L$ of ¼ foot, if the inter-transmitter distance S is chosen to be four sample intervals n then the spacing between the transmitters is one foot. Likewise, if the inter-receiver distance S is also chosen to be four sample intervals, this spacing also corresponds to one foot. As is illustrated in FIG. 3, the inter-receiver spacing and inter-transmitter spacing is preferably the same distance. FIG. 3 illustrates a typical transmitter-receiver spacing L. In the example illustrated in FIG. 3 this spacing is chosen to be 24 sample intervals m each of length $\Delta L$ for a distance of six feet. Generally, for a sample interval of $\Delta L$, the inter-transmitter and inter-receiver spacing S is determined by the relation $$S = n\Delta L. \tag{1}$$

$\Delta L$ is illustrated in FIG. 3, and the four sample intervals n between x-directed and the y-directed transmitter coils are indicated by the horizontal lines.

Similarly, the distance for the spacing between the transmitter-receiver spacing is determined by the relation $$L = m\Delta L. \tag{2}$$

In FIG. 3, to keep the drawing manageable, S and L are not shown to the same scale. L is compressed relative to S. In the interval illustrated some of the sample intervals within L are not explicitly illustrated. The approximately three-foot interval omitted is indicated by the vertical ellipsis.

All the instrument spacings are whole number multiples of the sampling interval $\Delta L$; m is suitably greater than n. Further, the distance between the centers of the dipoles in the transmitter array S divides evenly (i.e., without remainder) into the distance between the transmitter dipole centers and the corresponding receiver dipole centers L. In the example illustrated in FIG. 3, S=1 foot and L=6 feet followed from the choices $\Delta L$=¼ foot, n=4 (=S/$\Delta L$) samples per foot, and m=24 (=L/$\Delta L$) samples per foot. Thus S divides L without a remainder (L/S=6/1=6). However, S and L can be chosen arbitrarily subject to suitable choices of $\Delta L$, n, and m.

The instrument description of the direct-coupled transmitters and receivers to this point applies to existing, state-of-the-art triaxial induction logging instruments. The addition of the properly-spaced cross-coupled receiver coils 33 (see FIG. 3) is new. The three cross-coupled coil centers are spaced the same distances from the transmitter coil centers as the direct-coupled receiver coil centers. However, as illustrated in FIG. 3, the arrangement of the receiver dipoles is chosen to record the cross-coupled responses XZ, YX, and ZY. These are equal by reciprocity to the ZX, XY, and YZ cross-coupled components, which accordingly do not require separate measuring. Thus, the instrument described in this invention can respond to all the component elements of the magnetic induction tensor.

For a single sampling event that samples all the receivers simultaneously (or nearly simultaneously) the components as described so far are the components of different tensors, each corresponding to a different part of the formation. The direct-coupled components are associated with the volumes of formation between the transmitters and the direct-coupled receiver array, whereas the cross-coupled components are associated with the volumes of formation between the transmitters and the cross-coupled receiver array. As the magnetic induction apparatus is moved up (or down) the borehole, the direct-coupled transmitter-receiver pairs and the cross-coupled transmitter-receiver pairs will sequentially sample the formation until eventually all the transmitter-receiver pairs have sampled the same volume of formation.

Once this event has occurred the first magnetic induction tensor representation can be synthesized. Subsequent observations of the magnetic field signals at each subsequent sampling point permit the continuous synthesis of a representation of the magnetic induction tensor corresponding to each subsequent sampled point in the formation.

The synthesis of the magnetic induction tensor at a point is accomplished by selecting the appropriate six magnetic induction tensor components from among all the stored magnetic induction tensor component data. The six tensor components correspond to a particular point in the wellbore and thus in the earth medium. The particular point under discussion represents the mid-point between a transmitter and its corresponding receiver. For specificity call this point P. For a given sampling event, and considering only a single point P in the well, only a single transmitter-receiver pair midpoint can occupy the point P. However, during each sampling event six magnetic field component samples are obtained and stored, each corresponding to one of six sample points along the wellbore. One of the samples corresponds to the point P and the other five samples are associated with the other five transmitter-receiver pair midpoints.

Eventually during logging each transmitter-receiver pair will occupy each sample point. For example, beginning logging from the bottom of a well as the instrument samples its first observations the transmitter-receiver pair closest to the surface of the earth (i.e., at the top of the instrument) occupies a certain point P. As logging proceeds each transmitter-receiver pair in each array will eventually occupy the same sample point. Once the lowest (i.e., at the bottom of the instrument) transmitter-receiver pair has obtained a sample at this initial point, all the data required to synthesize the magnetic induction tensor at the point P have been collected.

The appropriate six signal elements are retrieved from their storage locations and, together with the depth of the observation, are recorded as the magnetic induction tensor characteristic of that sample point. Each subsequent sampling event yields data to synthesize the magnetic induction tensor corresponding to the next shallower depth. A record of the magnetic induction tensor synthesized at each sample point is available for the remainder of the logged interval.

The six stored magnetic induction tensor components that correspond to a particular point (P) are all the stored data corresponding to a particular sample point, or depth in the well, P. For each sample corresponding to point P one of the three transmitter coils is spaced at a position L/2 from the point P. The corresponding receiver coil (or other receiver device) is spaced L/2 from the point P in the direction from P opposite the transmitter. For each transmitter coil, there are exactly two such stored values, one corresponding to a direct-coupled receiver coil and the other to a cross-coupled receiver coil. Since there are three transmitter components, there are a total of six stored components.

The above steps are repeated until each transmitter and each receiver have sequentially occupied all the sample points in an interval of interest. At each sample point in the logged interval, voltages corresponding to three direct-coupled and three cross-coupled transmitter-receiver pairs are sampled.

These voltages are proportional to the corresponding magnetic field components, and can be stored directly as sampled voltage values, or can be converted to magnetic induction tensor components before being stored. The magnetic induction tensor components are combined to synthesize the full magnetic induction tensor. The stored magnetic induction tensor components can subsequently be used to estimate the formation conductivity tensor by inversion or other means known to persons skilled in the art.

The data storage and magnetic induction tensor synthesis for this invention is similar to the method employed by conventional instruments for recording the response points of axial receiver arrays using a common transmitter coil at the measure point of each array. When the data is plotted or otherwise combined, the data representing the various array responses are depth aligned. The new technique is that the triaxial induction logging apparatus described herein provides the additional magnetic induction components that are included in the synthesis to obtain the full magnetic induction tensor at a particular point.

In order that a continuous log be recorded, the sample interval is chosen to capture the entire variation in the signal. Persons skilled in the art will recognize that the sampling rate (number of samples per unit of depth) should preferably be at least two samples per distance between the receiver coil centers. The spatial frequency spectrum of the instrument response (i.e., the Fourier transform of the instrument's spatial impulse response) may be used to choose the minimum sampling rate. The sampling interval is preferably at least twice the highest spatial frequency observed in the spatial impulse response spectrum.

In conventional induction logging, receivers (or receiver arrays) spaced at different distances from the transmitter coils are used to sound the formation to different radial depths (called depths of investigation). From these data radial conductivity profiles can be deduced. This technique can be combined with the invention already described to construct arrays for sampling the magnetic induction tensor at multiple depths of investigation using multiple arrays. A dual-depth of investigation implementation is possible by deploying multiple receiver arrays around the same transmitter array (or multiple transmitter arrays) to sample different depths of investigations of the magnetic induction tensor.

FIG. 4 illustrates the cross-coupled "far" receiver array 41 and the cross-coupled "near" receiver array 43 above the transmitter array 30. Below the transmitter array 30 are the direct-coupled "near" receiver array 45 and the direct-coupled "far" receiver array 47. However, using the concept described herein the cross-coupled receiver arrays could be located below the transmitters and the direct-coupled receiver arrays could be above the transmitters without any changes in the theory or practice used to describe and employ the instrument, and accordingly this configuration of the instrument will not be further discussed.

The discussion of receivers to this point has been in terms of coils (or solenoids), but applies equally well to any direction-sensitive magnetic field detector (e.g., flux-gate magnetometers or SQUID (super conducting quantum interference device) magnetometers). The centers of these non-solenoidal receivers would be separated a distance L from the transmitter dipole center.

Persons skilled in the art could apply this invention to logs recorded where the instrument direction is into the borehole (the usual direction in logging while drilling) as well as moving up the borehole toward the surface of the earth (the usual direction in wireline logging operations).

EXAMPLE

Figure 5:
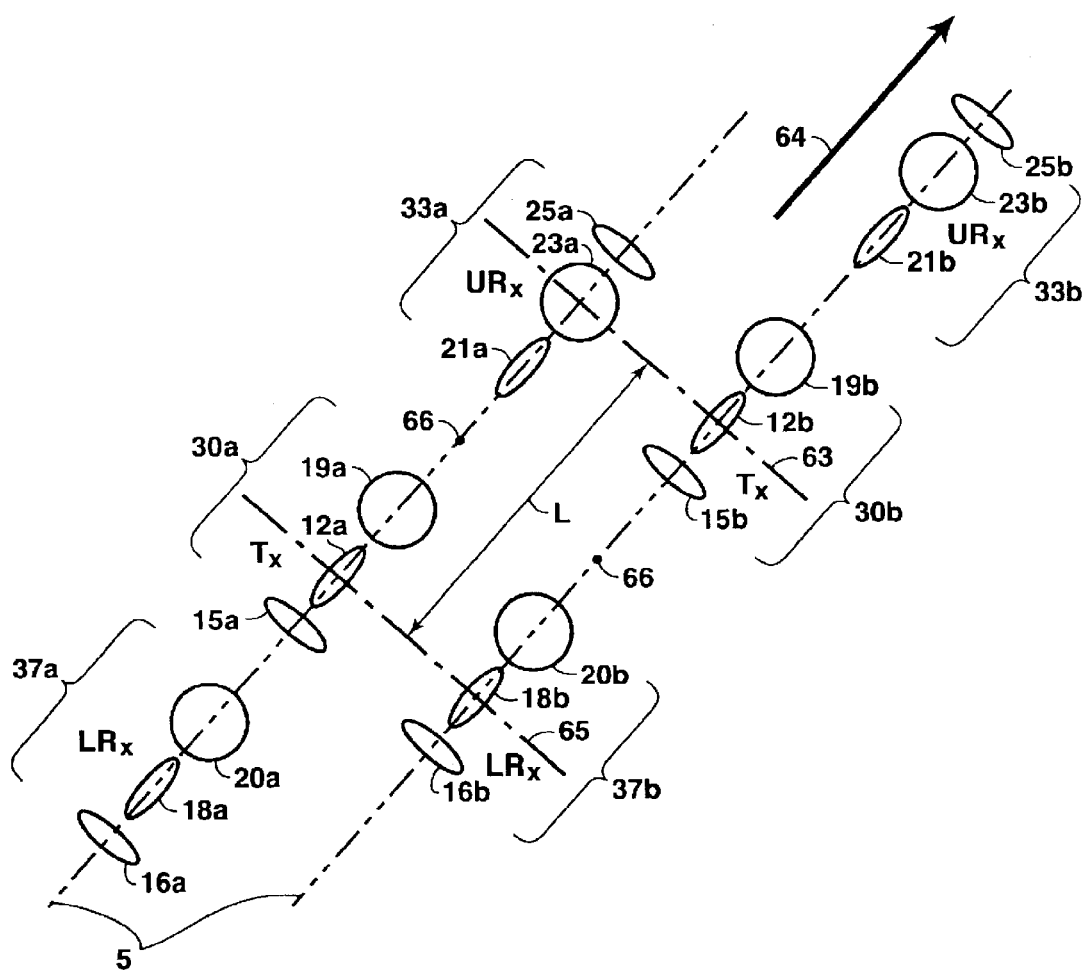
FIG. 5 is a schematic illustration of an embodiment of the triaxial induction logging instrument illustrating the method for acquiring the data necessary to synthesize the magnetic induction tensor.

To construct a proper magnetic induction tensor at each point in the formation, it is necessary to periodically sample and save for later use the responses of the arrays. As illustrated in FIG. 5, the arrays are oriented coaxially with the logging instrument axis 5. The cross-coupled array 33 (assumed for specificity of this discussion to be the upper array) responses are sampled and stored for later use. Since the instrument is moving up the borehole 64 axis (the usual direction in wireline logging operations) the transmitter array 30 will eventually occupy the same position 63 that the upper receiver array occupied when the upper receiver array data was sampled and stored.

The choice of spatial sampling rate (or interval) discussed above will guarantee that the instrument's (direct-coupled) responses 37 are sampled at points appropriate to combine with the previously sampled cross-coupled signals. The previously sampled cross-coupled signals were sampled at the same point 66 and were responding to the same volume of formation (i.e., between and surrounding 63 and 65 and centered on a common point 66). Therefore, when the transmitter array is in that same position 63 where the upper receiver array began operating and recording, the position of the lower receiver array will be in the same location 65 as the transmitter at the time of the first upper receiver array measurement.

The volume of formation sampled by the direct-coupled transmitter-receiver array when the transmitter array is centered on 63 and the receiver array is centered on 65 is the same volume of formation sampled by the cross-coupled transmitter-receiver array when the transmitter array is centered on 65 and the cross-coupled receiver array is centered on 63. For the first sampling the receivers are above the transmitters, whereas for the second sampling the transmitters are above the receivers.

The principle of reciprocity teaches that these responses are the same as would be obtained with the transmitters and receivers exchanged. Thus, the apparatus has collected data required to synthesize six elements of the magnetic induction tensor corresponding to the midpoint 66 of the transmitter-receiver array position during the first sampling. The magnetic induction tensor is known to be symmetric tensor because of electromagnetic reciprocity. This symmetry permits the three cross coupled components that have not been directly recorded to be obtained from the directly recorded cross-coupled components. Therefore, when the stored response data from the first record is combined with the response currently being recorded, the full magnetic induction tensor for the mid-point 66 between the upper receiver and transmitter arrays when the sampling and storage began is obtained.

The magnetic induction tensor is obtained by sampling at points spaced at regular intervals using the magnetic induction device and the data is stored. The magnetic induction device advances by one sample interval to the next sample point so that each transmitter and each receiver sequentially occupy the same point. The above steps are repeated until each transmitter and receiver array have sequentially occupied all desired points. When the final receiver has sampled the initial sample point the previously stored magnetic induction tensor components can then be appropriately combined to synthesize the magnetic induction tensor. The process can be repeated for each sample point thereafter producing a regularly-sampled representation of the magnetic induction tensor in real time (as the instrument is logging a well) from which a continuous magnetic induction tensor can be synthesized.

The large primary field signals exciting the receivers directly from the transmitters are not influenced by the formation conductivity and do not convey any information about the formation. These primary field signals must be canceled, or nulled, or "bucked out", in order to detect the much smaller signals from the formation. This is commonly accomplished by various arrangements of so-called "bucking" coils designed to fully cancel the primary field, but that attenuate the desired signal by a much smaller amount. In a practical embodiment of this invention, primary field cancellation by bucking coils or some other means would be required. However, the specific placement of bucking coils is not a part of this invention. The use of bucking coils is well known in the art and is described in U.S. Pat. Nos. 5,999,883 and 5,999,884 and accordingly will not be further described herein.

It should be understood that the preceding is merely a detailed description of specific embodiments of this invention and that numerous changes to the disclosed embodiments can be made in accordance with the disclosure herein without departing from the spirit or scope of the invention. The preceding description, therefore, is not meant to limit the scope of the invention. Rather, the scope of the invention is to be determined only by the appended claims and their equivalents.

What is claimed is:

1. A magnetic induction apparatus capable of inducing and recording all components of the magnetic induction tensor induced in an earth formation, comprising:
   (a) at least one triaxial transmitter array comprising at least three transmitter dipoles, three of the dipoles being mutually orthogonal, the three mutually orthogonal dipoles adapted to transmit a magnetic signal into the earth formation and thereby induce eddy currents in the earth formation;
   (b) at least one triaxial receiver array comprising at least three receiver dipoles, three of the dipoles being mutually orthogonal, the three mutually orthogonal receiver dipoles oriented so as to be direct-coupled to the mutually orthogonal transmitter dipoles;
   (c) at least one triaxial receiver array comprising at least three receiver dipoles, three of the dipoles being mutually orthogonal, the three mutually orthogonal receiver dipoles oriented so as to be cross-coupled to the mutually orthogonal transmitter dipoles; and
   (d) means for detecting and storing voltages induced in the receiver dipoles by the eddy currents.

2. The apparatus of claim 1 wherein the dipole centers in the direct-coupled receiver array and the dipole centers in the cross-coupled receiver array are spaced the same distance from their corresponding transmitter dipole center.

3. The apparatus of claim 1 comprising one transmitter array and two receiver arrays wherein each of the three mutually orthogonal transmitter dipoles corresponds to one mutually orthogonal receiver dipole in each of the two receiver arrays.

4. The apparatus of claim 1 comprising a first and second transmitter array and a first and second receiver array wherein the first transmitter array is direct coupled with a corresponding first receiver array and the second transmitter array is cross-coupled with a corresponding second receiver array and each receiver dipole in the first and second receiver arrays corresponds to at least one transmitter dipole in the corresponding transmitter array.

5. The apparatus of claim 1 wherein the receivers are direction-sensitive magnetometers.

6. The apparatus of claim 1 wherein the distance between the centers of the dipoles in the transmitter evenly divides into the distance between the transmitter dipole center to the corresponding receiver center.

7. The apparatus of claim 1 further comprising additional direct-coupled and cross-coupled arrays of mutually orthogonal receivers spaced at different distances from the transmitter dipole centers to record the magnetic induction tensor at different radial depths.

8. The apparatus of claim 1 further comprising bucking coils to cancel the primary field.

9. A magnetic induction apparatus capable of inducing and recording all components of the magnetic induction tensor induced in an earth formation, comprising:
   (a) at least one triaxial receiver array comprising at least three receiver dipoles, three of the dipoles being mutually orthogonal;
   (b) at least one triaxial transmitter array comprising at least three transmitter dipoles, three of the dipoles being mutually orthogonal, the three mutually orthogonal dipoles adapted to transmit a magnetic signal into the earth formation and thereby induce eddy currents in the earth formation, the three mutually orthogonal transmitter dipoles oriented so as to be direct-coupled to the mutually orthogonal receiver dipoles;
   (c) at least one triaxial transmitter array comprising at least three transmitter dipoles, three of the dipoles being mutually orthogonal, the three mutually orthogonal dipoles adapted to transmit a magnetic signal into the earth formation and thereby induce eddy currents in the earth formation, the three mutually orthogonal transmitter dipoles oriented so as to be cross-coupled to the mutually orthogonal receiver dipoles; and
   (d) means for detecting and storing voltages induced in the receiver dipoles by the eddy currents.

10. The apparatus of claim 9 wherein the dipole centers in the direct-coupled transmitter array and the dipole center in the cross-coupled transmitter array are spaced the same distance from their corresponding receiver array.

11. The apparatus of claim 9 comprising one receiver array and two transmitter arrays wherein each of the three mutually orthogonal receiver dipoles corresponds to one mutually orthogonal transmitter dipole in each of the two transmitter arrays.

12. The apparatus of claim 9 comprising a first and second transmitter array and a first and second receiver array wherein the first transmitter array is direct coupled with a corresponding first receiver array and the second transmitter array is cross-coupled with a corresponding second receiver array and each receiver dipole in the first and second receiver arrays corresponds to at least one transmitter dipole in the corresponding receiver array.

13. The apparatus of claim 9 wherein the receivers are direction-sensitive magnetometers.

14. The apparatus of claim 9 wherein the distance between the centers of the dipoles in the transmitter evenly divides into the distance between the transmitter dipole center to the corresponding receiver dipole center.

15. The apparatus of claim 9 further comprising additional direct-coupled and cross-coupled arrays of mutually orthogonal receivers spaced at different distances from the transmitter dipole centers to record the magnetic induction tensor at different radial depths.

16. The apparatus of claim 9 further comprising bucking coils to cancel the primary field.

17. A method to record the components of a magnetic induction tensor in an earth formation using a magnetic induction apparatus comprising:

(a) providing a magnetic induction apparatus comprising, at least one triaxial transmitter array comprising at least three transmitters dipoles, three of the dipoles being mutually orthogonal, the three mutually orthogonal dipoles adapted to transmit a magnetic signal into the earth formation and thereby induce eddy currents in the earth formation, at least one triaxial receiver array comprising at least three receiver dipoles, three of the dipoles being mutually orthogonal, the three mutually orthogonal receiver dipoles oriented so as to be direct-coupled to the mutually orthogonal transmitter dipoles, at least one triaxial receiver array comprising at least three receiver dipoles, three of the dipoles being mutually orthogonal, the three mutually orthogonal receiver dipoles oriented so as to be cross-coupled to the mutually orthogonal transmitter dipoles; and means for detecting and storing voltages induced in the receiver dipoles by the eddy currents; and (b) sampling at least one magnetic induction tensor component using the magnetic induction apparatus.

18. The method of claim 17 further comprising sampling at least one magnetic induction tensor component per receiver per sample point.

19. The method of claim 17 further comprising:

(a) Selecting regularly spaced intervals wherein a whole number of intervals fit into the determined distance between the transmitter center and receiver center;

(b) Sampling at least one magnetic induction tensor component per receiver per sample point using the magnetic induction device;

(c) Storing the magnetic induction tensor components that were sampled at the regularly spaced sample interval;

(d) Moving the triaxial logging instrument one sampling interval per sample so that each transmitter and receiver sequentially occupy the same point;

(e) Repeating steps (b), (c), and (d) until each transmitter and each receiver array have sequentially occupied all desired points in a logged interval; and (f) Combining the magnetic induction components to synthesize the magnetic induction tensor at each desired point.

20. Magnetic induction tensor data that have been produced according to the method of claim 19.

21. A method to record the components of a magnetic induction tensor in an earth formation using a magnetic induction apparatus comprising:

(a) providing a magnetic induction apparatus comprising, at least one triaxial receiver array comprising at least three receiver dipoles, three of the dipoles being mutually orthogonal, at least one triaxial transmitter array comprising at least three transmitter dipoles, three of the dipoles being mutually orthogonal, the three mutually orthogonal dipoles adapted to transmit a magnetic signal into the earth formation and thereby induce eddy currents in the earth formation, the three mutually orthogonal transmitter dipoles oriented so as to be direct-coupled to the mutually orthogonal receiver dipoles, at least one triaxial transmitter array comprising at least three transmitter dipoles, three of the dipoles being mutually orthogonal, the three mutually orthogonal dipoles adapted to transmit a magnetic signal into the earth formation and thereby induce eddy currents in the earth formation, the three mutually orthogonal transmitter dipoles oriented so as to be cross-coupled to the mutually orthogonal receiver dipoles, and means for detecting and storing voltages induced in the receiver dipoles by the eddy currents;

(b) sampling at least one magnetic induction tensor component using the magnetic induction apparatus.

22. The method of claim 21 further comprising sampling at least one magnetic induction tensor component per receiver per sample point.

23. The method of claim 21 further comprising estimating the hydrocarbon potential of a subterranean earth formation from the magnetic induction tensor components.

24. The method of claim 21 further comprising:

(a) Selecting regularly spaced intervals wherein a whole number of intervals fit into the determined distance between the transmitter center and receiver center;

(b) Sampling at least one magnetic induction tensor component per receiver per sample point using the magnetic induction device;

(c) Storing the magnetic induction tensor components that were sampled at the regularly spaced sample interval;

(d) Moving the triaxial logging instrument one sampling interval per sample so that each transmitter and receiver sequentially occupy the same point;

(e) Repeating steps (b), (c), and (d) until each transmitter and each receiver array have sequentially occupied all desired points in a logged interval; and (f) Combining the magnetic induction components to synthesize the magnetic induction tensor at each desired point.

25. Magnetic induction tensor data that have been produced according to the method of claim 24.

* * * * *